(12) United States Patent
Pelletier et al.

(10) Patent No.: US 7,986,840 B2
(45) Date of Patent: Jul. 26, 2011

(54) TRACKING WORKFLOW IN MANIPULATING MEDIA ITEMS

(75) Inventors: Jean-Francois Pelletier, Los Angeles, CA (US); Gregory Niles, Culver City, CA (US)

(73) Assignee: Apple Inc., Cupertino, CA (US)

( * ) Notice: Subject to any disclaimer, the term of this patent is extended or adjusted under 35 U.S.C. 154(b) by 1138 days.

(21) Appl. No.: 11/735,385

(22) Filed: Apr. 13, 2007

(65) Prior Publication Data
US 2008/0253609 A1 Oct. 16, 2008

(51) Int. Cl.
*G06K 9/00* (2006.01)
(52) U.S. Cl. .......... 382/190; 382/103; 345/594
(58) Field of Classification Search .......... 382/190; 385/103, 190
See application file for complete search history.

(56) References Cited

U.S. PATENT DOCUMENTS

| | | | | | |
|---|---|---|---|---|---|
| 5,469,536 | A | * | 11/1995 | Blank | 345/594 |
| 5,982,909 | A | * | 11/1999 | Erdem et al. | 382/103 |
| 6,061,055 | A | * | 5/2000 | Marks | 382/276 |
| 6,243,103 | B1 | * | 6/2001 | Takiguchi et al. | 345/634 |
| 7,254,782 | B1 | * | 8/2007 | Sherer | 715/764 |
| 2003/0090593 | A1 | * | 5/2003 | Xiong | 348/620 |

* cited by examiner

*Primary Examiner* — Hadi Akhavannik
(74) *Attorney, Agent, or Firm* — Fish & Richardson P.C.

(57) ABSTRACT

A computer-implemented method is described including receiving input specifying an image frame from among a series of image frames, and automatically detecting one or more points in the specified image frame that would be suitable for tracking a point in the series of image frames. In addition, a computer-implemented method is described including choosing a first position of a point on a first image frame of a plurality of image frames, and displaying in a bounded region on the first image frame content relating to a second image frame of the plurality of image frames, wherein the content displayed in the bounded region includes a second position of the point at a different time than the first position of the point.

30 Claims, 4 Drawing Sheets

TRACKING WORKFLOW IN MANIPULATING MEDIA ITEMS

TECHNICAL FIELD

The following description relates to tracking motion on frames in a video editing environment.

BACKGROUND

Motion pictures can be captured and recorded as video using a variety of instruments including video cameras, cellular telephones, and the like. The recorded video can be viewed using applications including QuickTime movie player, Windows Media player, and the like. In addition, the recorded video can be edited using applications such as Motion offered by Apple Inc. (Cupertino, Calif.). Video editing applications can enable a user to add special effects to the recorded content. A user can add special effects to all or portions of the recorded content. The content with the added special effects can be stored on storage devices and played back using video viewing applications.

Video content recorded using suitable instruments can be stored as a series of image frames. Each image frame can represent a snapshot in time. When the video content is edited, an editor can access each image frame. The user can track the motion of all or a portion of an image in an image frame by selecting a point in the image and following the position of the selected point across successive image frames. The tracked point in the image can serve as a reference point for adding special effects to the content.

SUMMARY

In one example, one or more points in an image frame can be chosen, e.g., using corner detection schemes, for tracking changes in the position of points across image frames. A tracking scheme can be employed to track the position of the points across image frames. While displaying a point in a reference image frame, the position of the point in a future image frame can be viewed and chosen by looking ahead to the future image frame. The position of the point in the future image frame can be provided to the tracking scheme for tracking the position of the point across successive image frames from the reference image frame to the future image frame.

In one aspect, a computer-implemented method is described. The method includes receiving input specifying an image frame from among a series of image frames, and automatically detecting one or more points in the specified image frame that are suitable for tracking a point in the series of image frames.

This and other aspects can include one or more of the following features. The specified image frame can correspond to a first time instant in the series of image frames. The method can further include tracking the point in a plurality of image frames. The plurality of image frames can be from among the series of image frames. Each frame in the plurality of image frames can correspond to a time instant later than the first time instant. Automatically detecting one or more points can include applying a corner detection scheme to the specified image frame. The corner detection scheme can be the Harris corner detection scheme.

In another aspect, a computer-implemented method is described. The method can include choosing a first position of a point on a first image frame of a plurality of image frames, and displaying in a bounded region on the first image frame content relating to a second image frame of the plurality of image frames, wherein the content displayed in the bounded region can include a second position of the point at a different time than the first position of the point.

This and other aspects can include one or more of the following features. The method can further include choosing the second position of the point inside the bounded region, and providing the second position as an input for tracking the position of the point from the first image frame to the second image frame. The bounded region can be displayed on the first image in an area surrounding the point. The plurality of image frames can relate to a video content. The first image frame can correspond to a first time instant in the video content. The second image frame can correspond to a second time instant in the video content. The second time instant can be after the first time instant. The choosing can include analyzing the first image frame using a corner detection scheme. The corner detection scheme can be the Harris corner detection scheme. The method can further include highlighting one or more points on the first image frame chosen by the corner detection scheme. The point can be chosen by a user. The point can be one of the one or more points. The second position can correspond to the position of the point in the second image frame. The first position can be highlighted within the bounded region. Choosing the second position can cause a line to be displayed connecting the first position and the second position. A line can be drawn from the first position to the chosen second position. The content within the bounded region can be zoomed in view of the content in the second image frame. Tracking the position of the point can include tracing a position of the point in an image frame of the plurality of image frames successive to the first image frame, and upon being unable to trace the position of the point in a successive image frame, using the second position of the point as an estimate of an actual position of the point for subsequent tracing.

In another aspect, a medium bearing instructions to enable one or more machines to perform operations is described. The operations include receiving input specifying an image frame from among a series of image frames, and automatically detecting one or more points in the specified image frame that would be suitable for tracking a point in the series of image frames.

This and other aspects can include one or more of the following features. The specified image frame can correspond to a first time instant in the series of image frames. The operations can further include tracking the point in a plurality of image frames. The plurality of image frames can be from among the series of image frames. Each frame in the plurality of image frames can correspond to a time instant later than the first time instant. Automatically detecting the one or more points can include applying a corner detection scheme to the specified image frame. The corner detection scheme can be the Harris corner detection scheme.

In another aspect, a medium bearing instructions to enable one or more machines to perform operations is described. The operations include choosing a first position of a point on a first image frame of a plurality of image frames, and displaying in a bounded region on the first image frame content relating to a second image frame of the plurality of image frames, wherein the content displayed in the bounded region includes a second position of the point at a different time than the first position of the point.

This and other aspects can include one or more of the following features. The operations can include choosing the second position of the point inside the bounded region, and providing the second position as an input for tracking the position of the point from the first image frame to the second image frame. The bounded region can be displayed on the first image in an area surrounding the point. The plurality of image frames can relate to a video content. The first image frame can correspond to a first time instant in the video content. The second image frame can correspond to a second time instant in the video content. The second time instant can be after the first time instant. The choosing can include analyzing the first image frame using a corner detection scheme. The corner detection scheme can be the Harris corner detection scheme. The operations can further include highlighting one or more points on the first image frame chosen by the corner detection scheme. The point can be chosen by a user. The point can be one of the one or more points. The second position can correspond to the position of the point in the second image frame. The first position can be highlighted within the bounded region. Choosing the second position can cause a line to be displayed connecting the first position and the second position. A line can be drawn from the first position to the chosen second position. The content within the bounded region can be a zoomed in view of the content in the second image frame. Tracking the position of the point can include tracing a position of the point in an image frame of the plurality of image frames successive to the first image frame, and upon being unable to trace the position of the point in a successive image frame, using the second position of the point as an estimate of an actual position of the point for subsequent tracing.

The systems and techniques described here can present one or more of the following advantages. Receiving recommendation regarding reference points in an image frame can enable a user to choose a reference point that can be efficiently tracked across successive image frames. Further, employing corner detection algorithms to provide recommendation regarding the reference points can further increase tracking efficiency and alleviate the burden on a user to select suitable reference points. In addition, displaying to a user, the positions of a tracked point in a subsequent frame can enable the user to provide, as input, the position and a trajectory of the point in the subsequent frame as guidance for tracking. Furthermore, clips containing fast moving features, clips with subjects moving in relatively straight vectors, clips containing swish pans can be tracked.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
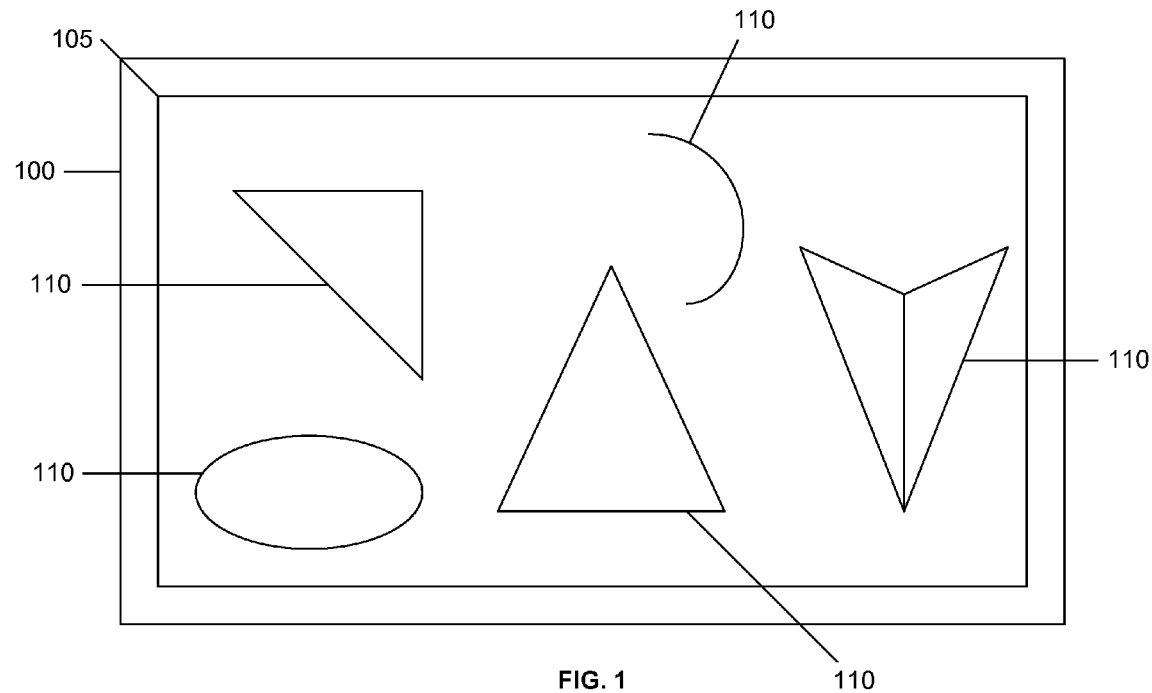
FIG. 1 is a schematic of an example of a user interface displaying a reference image frame.

FIG. 1 is a schematic of an example of a user interface 100 displaying an image frame related to video content. The video content can be recorded using any suitable device, e.g., video camera. The video content can be stored on any suitable storage device, e.g., hard disk of a personal computer, universal serial bus (USB) memory device, compact disc (CD), digital video disc (DVD), and the like. The storage device can be operatively coupled to a system on which the application for editing the video is installed. The system can include one of a personal computer, a laptop computer, a personal digital assistant (PDA), a smart phone, a workstation, and the like. In addition, the system can include or be operatively coupled to a display device. The display device can include one of a cathode ray tube (CRT) and liquid crystal display (LCD) monitor. The user interface 100 can be displayed in the display device. A user can use a key board and virtually any suitable pointing device (e.g., mouse, track ball, stylus, touch screen) to interact with the video editing application. The system, the display device, the key board, and the pointing device can be operatively coupled through wired or wireless means.

In some implementations, a reference image frame 105 in the recorded video can be displayed in the user interface 100. The reference image frame 105 can be any image frame in the video. The reference image frame 105 can include in the display, one or more objects 110. The objects 110 can be of any shape, size, and dimension. For example, the objects 110 can be a one dimensional (1D) line. In another example, the objects 110 can be a two dimensional (2D) closed surface. In another example, the objects 110 can be three dimensional (3D). In another example, the objects can be a combination of 1D, 2D, and 3D objects. When the video content is viewed, the objects 110 may be in motion or stationary. The motion can include translation, rotation, or both. When the reference image frame 105 is viewed, the objects 110 can be stationary. One or more objects 110 displayed in the reference image frame 105 can include one or more corners.

In some implementations, a user can detect corners on one or more objects 110 in the reference image frame 105 by employing a corner detection scheme. For example, the user can detect corners on one or more objects 110 in the reference image frame 105 by employing the Harris corner detection scheme, which is described in "A combined corner and edge detector," C. Harris and M. Stephen, Proceedings of the $4^{th}$ Alvey Vision Conference, 1988, pp. 147-151 and "Geometry from visual motion," C. Harris, Active Vision, A. Blake and A. Yuille, 1992, MIT Press, Cambridge Mass., the contents of which are incorporated herein by reference. Alternatively, any corner detection scheme (e.g., Moravec scheme, Trajkovic and Hedley scheme, the Kanade-Tomasi scheme, and the like) can be used to detect corners on one or more objects 110.

Figure 2:
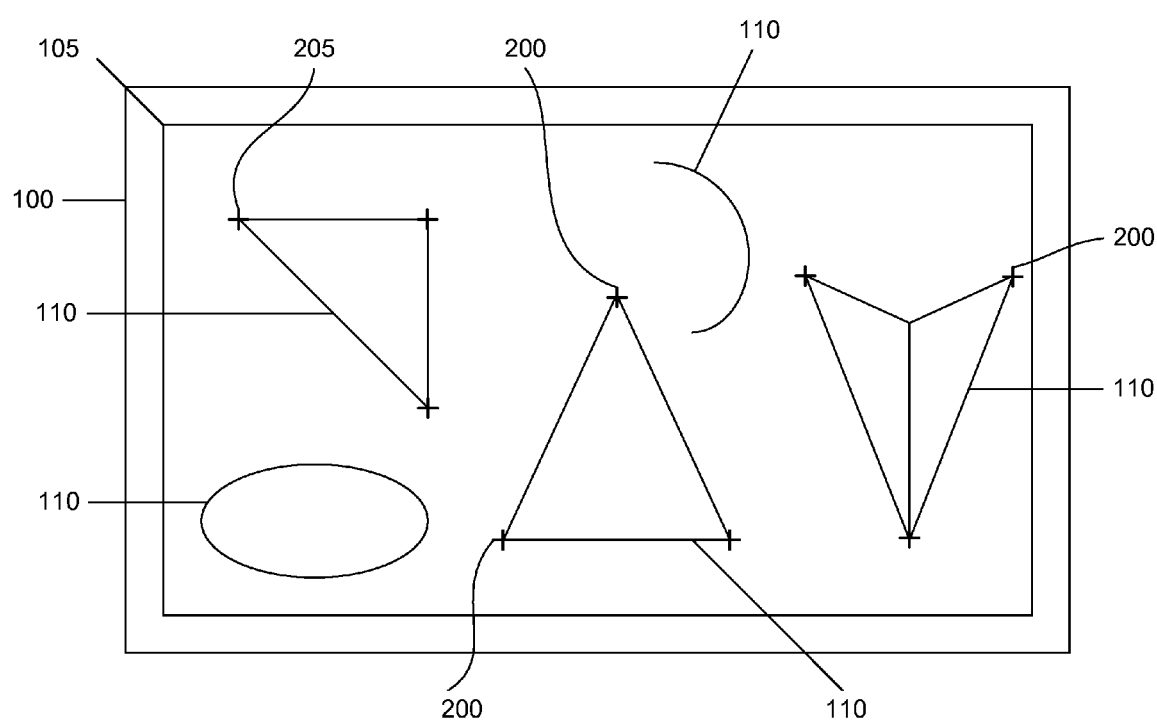
FIG. 2 is a schematic of an example of a user interface displaying recommendations for tracking.

FIG. 2 is a schematic of an example of a user interface 100 wherein points on one or more objects 110 are highlighted as recommended points for tracking 200. The corner detection scheme can analyze the image frame to determine one or more points that can be efficiently tracked. Tracking can include choosing a point in a reference image frame as a reference point and following the change in position of the reference point in successive image frames. In addition, tracking can include following the change in positions of all points in a reference image frame relative to the reference point in successive image frames. Any feature that seems unique in the image can be tracked instead of, or in addition to, corners. In some implementations, corners can be chosen because, given the orientation and contrast, the position of a corner in one frame can be easy to match in subsequent frames. Upon analyzing the reference image frame 105 for suitable reference points, the corner detection scheme can recommend one or more points 200 on one or more objects 110 displayed in the reference image frame 105. The recommended points 200 can indicate to a user that choosing one of the recommended points 200 can increase the efficiency of tracking the motion of the chosen point and all points in the frame, across successive frames. In some implementations, the recommended points 200 can be highlighted by placing a plus sign (+) on the points 200. Alternatively, the recommended points 200 can be highlighted by any method that can render the recommended points 200 easily discernible to a user viewing reference image frame 105 on the user interface 100. In some implementations, the recommended points 200 can be located at corners of objects 110 displayed in the reference image frame 105.

In some implementations, input can be received specifying an image frame from among a series of image frames. One or more points in the specified image frame can be automatically detected, wherein the detected points would be suitable for tracking a point in the series of the image frames. In some implementations, the specified image frame can correspond to a first time instant in the series of image frames. For example, the specified image frame can be the first image frame corresponding to a time instant, t=0. In such implementations, a point from among the automatically detected one or more points can be chosen to track a change in position across a plurality of image frames, wherein each image frame of the plurality of image frames corresponds to a time instant later than the first time instant. For example, the specified image frame can be the first of a series of image frames. The point to be tracked can be located on the first image frame. The plurality of image frames from the series of image frames where the point is tracked can be frames 2-10. The time instant of each image frame 2-10 can correspond to a time instant later than the first image frame.

Alternatively, the specified image frame can be the last image frame in the series of image frames. Thus, if the duration of the recorded video content is t time units, then the time instant corresponding to the specified image frame can be time, t=t. The point detected for tracking can be on the last image frame. The plurality of image frames chosen to track the point can be the last 10 frames prior to the last image frame. The time instant of each image frame prior to the last image frame can correspond to a time instant before the first image frame. In this manner, the point recommended for tracking can be suitable for tracking forward or backward in time across a series of image frames. The one or more points in a specified image frame can be selected by applying a corner detection scheme to the specified image frame.

A user can select one of the points 200 recommended by the corner detection scheme. In some implementations, the user can select a point 205 at a corner of an object 110 for tracking. The video editing application can track the motion of the point in successive frames using a tracking scheme.

A tracking scheme can work by analyzing an area of pixels over a range of frames in order to "lock onto," i.e., choosing the area of pixels and following the positions of the pixels in the pattern as it moves across the sequence. A user can specify the point for tracking in the sequence. The tracking scheme can advance to each subsequent frame by sampling a search region around the point. The tracking scheme can match the initial pattern at every position of the search region by assigning a correlation value indicating how close the current pattern at the sample position matches the initial pattern. The tracking scheme can repeat the process for every position in the search region. Subsequently, the tracking scheme can choose the position with the highest score, wherein the score corresponds to the correlation value. The highest score being less than a threshold can be an indication that the point has been lost.

In some implementations, the tracking scheme can lose the position of the tracked point during motion from a first frame to a successive frame. Once the position of the tracked point in a frame is lost, further tracking of the point may not be possible.

Figure 3:
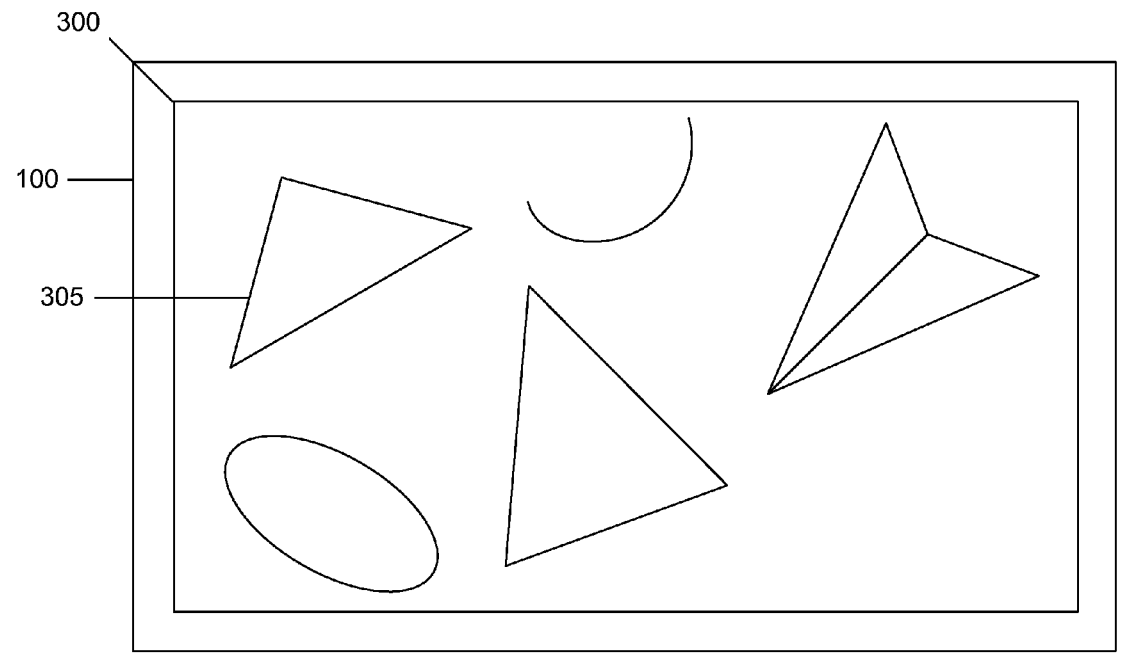
FIG. 3 is a schematic of an example of a user interface displaying an image frame at a time instant later than that of the reference image frame.

FIG. 3 is an example of a schematic of a future image frame 300 at a time instant later than that of the reference image frame 105. The position of the objects 110 in the video may have changed over time. Thus, while the objects 110 in the reference image frame 105 are in a first position, the objects 305 in the future image frame 300 can be in a different position. The change in position can include a rotation, a translation, or both. The tracking scheme can track the position of the chosen point 205 on the reference image frame 105 across successive frames. Due to factors including noise in the recorded video, the tracking scheme may be unable to update the position of the chosen point 205 from a first frame to a successive frame. Additional factors for a tracking scheme being unable to update a point can include very fast motion that is greater in magnitude from one frame to the next than the search area around the point in the preceding frame, strong geometric change in the pattern around the tracked point from one frame to the next, occlusion in the scene in front of the tracked point, e.g., the tracked point passes through an object, and the like. The user can provide a position of a chosen point 205 in a future image frame 300 as input to the tracking scheme to enable tracking the position of the chosen point 205 from the reference image frame 105 to the future image frame 300.

Figure 4:
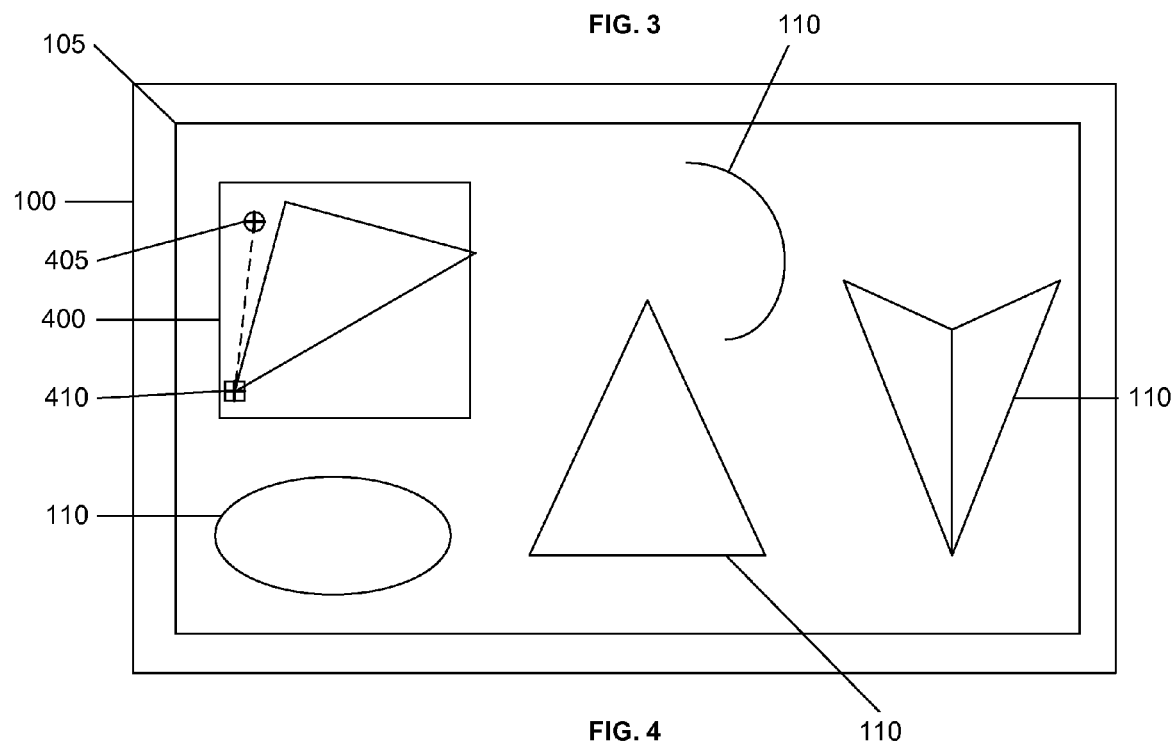
FIG. 4 is a schematic of an example of a user interface displaying a view port displaying a future position of a point in an image frame.

FIG. 4 is a schematic of an example of a view port 400 for providing a position of point in a future image frame to the tracking scheme. In some implementations, the user can choose a point from the points recommended by the corner detection scheme. For example, the user can choose point 205 for tracking. In some implementations, a view port 400 can be displayed surrounding the chosen point 205. The view port can be a bounded region displayed in an area of the reference image frame 105 including the chosen point 205. The content displayed within the view port 400 can correspond to an image frame at a time other than that of the reference image frame 105. For example, if the reference image frame 105 is the first frame in the video, the content within the view port 400 can correspond to the fourth frame. The content of the reference image frame 105 outside the view port 400 can correspond to the first frame. In the example shown, the position of object 305 in the future image frame 300 is different from the position of the same object in the reference image frame 105. When the view port 400 is positioned around the chosen point 205, the image within the view port 400 can display object 305. The images outside the view port 400 can display the remaining objects in the reference image frame 105.

In some implementations, the point chosen in the reference image frame 105 can be highlighted by a first symbol 405. A user can see in the view port 400, the position of the chosen point 205 in the future image frame 300. In some implementations, the user can select the future position of the chosen point 205 in the future image frame 300. When the user selects the future position, the position can be highlighted by a second symbol 410. In addition, a line connecting the chosen point 205 and the future position of the chosen point 205 can be displayed on the user interface 100. In other implementations, the user can place a cursor on the chosen point 205 and draw a line from the chosen point 205 to the future position of the chosen point. The future position of the chosen point 205, chosen by the user, can be the input to the tracking scheme. Upon receiving this input, the tracking scheme can track the position of the chosen point 205 in the reference image frame 105 across successive frames. If the tracking scheme is unable to detect the position of the chosen point 205 across two frames, the tracking scheme can use the future position of the chosen point 205 provided by the user as an estimation of the position of the chosen point 205 and continue tracking.

In some implementations, the view port 400 can be a square. Alternatively, the view port 400 can be any shape including rectangle, circle, and the like. In some implementations, the images in the view port 400 can be scaled up. For example, the display of the images in the view port 400 can be a zoomed in display. This can enable viewing the position of the chosen point 205 in the future image frame 300 if the difference in position between the chosen point 205 in the reference image frame and in the future image frame are not easily discernible to the user. The user can select the position of the chosen point 205 in the zoomed in display of the future image frame 300. In this manner, the user can enable tracking the position of the chosen point 205 if the change in position is not significant.

In some implementations, the future image frame 300 displayed within the view port 400 can be relative to the reference image frame 105. For example, if the reference image frame 105 is frame number X, the future image frame 300 can be frame number X+3. The relative number of frames between the future image frame 300 and the reference image frame 105 can be determined by the system. Alternatively, the relative number of frames can be specified by the user. In some implementations, more than one future image frames 300 may be available from which a user can choose. For example, when the user displays the view port 400 around a chosen point 205, the user can be presented with a list of future image frames 300, wherein the relative number of frames between each future image frame 300 in the list and the reference image frame 105 is different. The user can choose from among the list of future reference image frames 300.

In some implementations, the user can display a view port 400 around the chosen point 205 using a pointing device operatively coupled to the system and the display device. For example, the pointing device can be a mouse. The user can choose a recommended point 200 with the mouse. Further, the user can display the view port 400 by clicking the mouse on the chosen point 205. In other implementations, the display device can be a touch screen. The user can choose a recommended point 200 by touching the recommended point. The user can display the view port 400 by touching the chosen point 205. In other implementations, the display device can include a near contact screen. The near contact screen can include a sensor to sense the presence of a pointer, e.g., a user's finger, near the screen. The user can choose a recommended point 200 and display a view port 400 around the chosen point 205 using a pointer.

Figure 5:
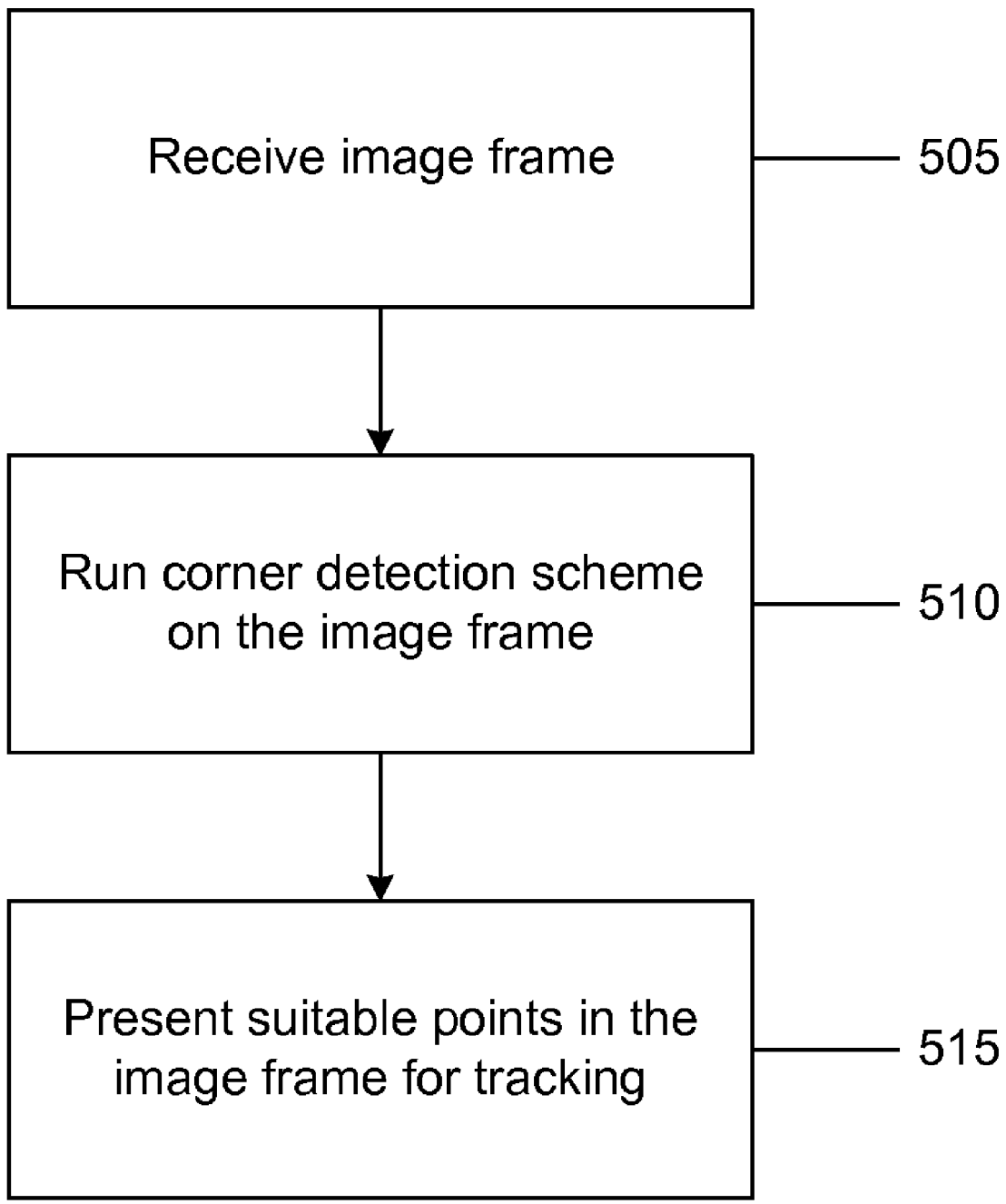
FIG. 5 is a flow chart of an example of a process for recommending points for tracking.

FIG. 5 is a flow chart of an example of a process for identifying suitable points for tracking. In some implementations, the image frame can be received at 505. The image frame can be one of a plurality of image frames. The plurality of image frames can relate to a media item, e.g., a video. The plurality of image frames can be viewed in a user interface on a display device. The image frame can be any frame in the plurality of image frames. For example, by default, the image frame can be the first frame in the video file. Alternatively, the image frame can be chosen by the user.

A corner detection scheme can be run on the image frame at 510. The corner detection scheme can be run by the user. In some implementations, the user can select the entire image frame to run the corner detection scheme. In other implementations, the user can select a portion of the image frame to run the corner detection scheme. In some implementations, the system can recommend one or more portions of the image frame to run the corner detection scheme. The user can accept one of the recommendations or can choose a different image frame. In some implementations, the corner detection scheme can be the Harris corner detection scheme. Alternatively, the corner detection scheme can be the Moravec corner detection scheme or the Trajkovic and Hedley corner detection scheme.

Suitable points for tracking, in the image frame, can be presented at 515. In some implementations, one or more points in the image frame can be determined by running the corner detection scheme. Each point can be presented in a user interface on a display device by highlighting the determined point. In some implementations, the highlighting can be a "+" sign. In other implementations, one or more points in one or more portions of the image frame, chosen by the user to run the corner detection scheme, can be presented to the user. The highlighted points can be positioned within the regions in which the corner detection scheme is run. One or more of the selected points can be chosen for tracking the change in position of the point between successive image frames. In some implementations, the point can be selected by the user. In other implementations, the point can be selected by the system. In other implementations, the system can recommend a point. The user can accept the system's recommendation or over ride the recommendation with a different point. The different point may or may not be one of the points determined by the corner detection scheme.

Figure 6:
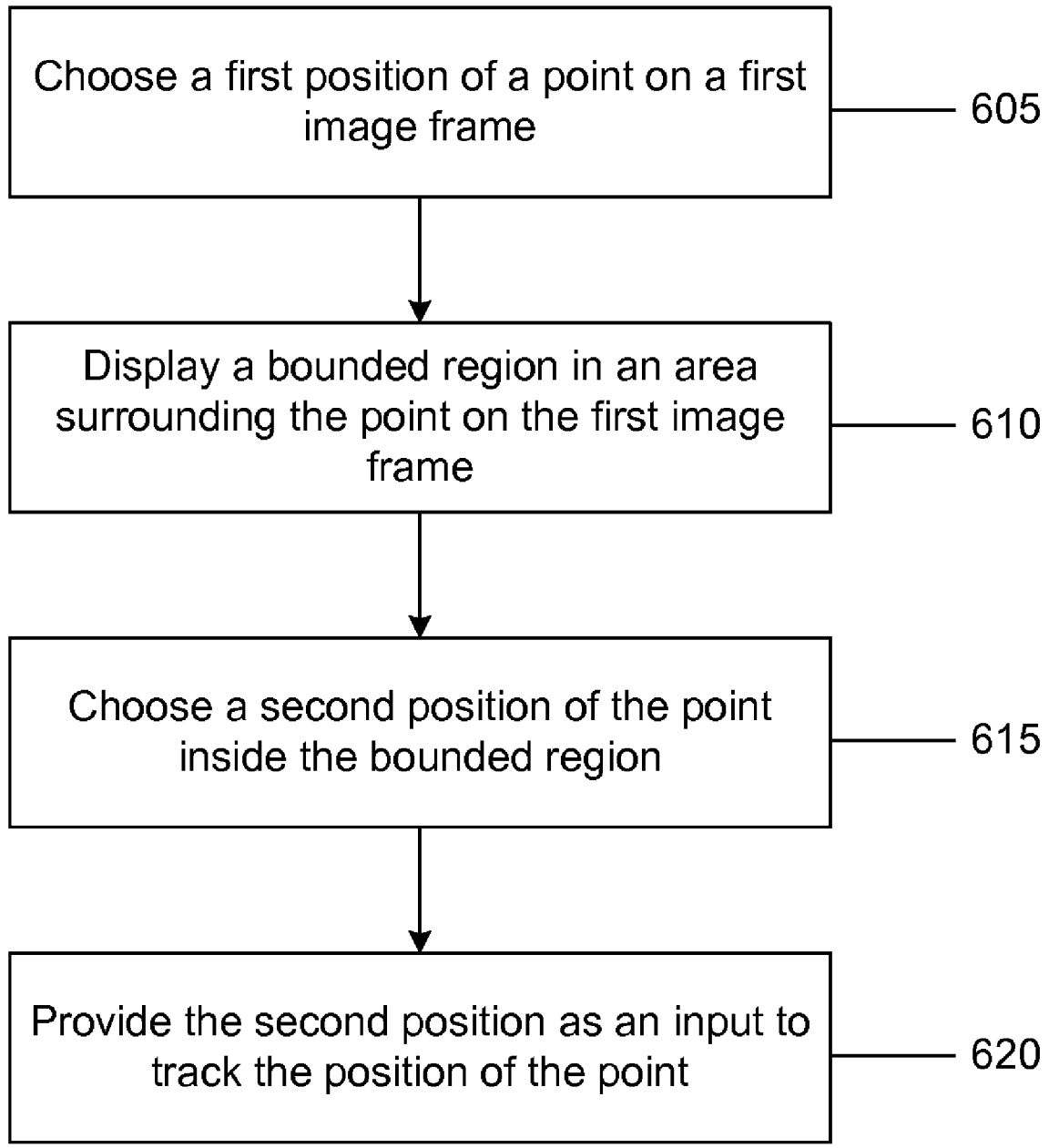
FIG. 6 is a flow chart of an example of a process for providing input to track a position of a point across successive frames.

FIG. 6 is a flow chart of an example of a process for providing input to track a point on an image frame. A point can be tracked across successive image frames between the first and second image frame. The image frames between and including the first and second image frame can be part of a plurality of image frames, where the plurality of image frames relate to a media item, e.g., a video. In some implementations, a first position of a point on a first image frame can be chosen at 605. The point can be any point on the image frame. Alternatively, the point can be chosen from among one or more recommended points. The one or more points can be recommended by running a corner detection scheme on the image frame to determine suitable points. The first position of the point can be chosen by a user. The chosen point can be one among the one or more recommended points or can be a different point on the image frame.

A bounded region can be displayed in an area surrounding the first position of the point on the first image frame at 610. The bounded region can be a view port that, when placed on the first image frame, can enable a user to look ahead at the content in a second image frame in the area occupied by the bounded region. For example, the first image frame can correspond to a first frame in the plurality of image frames. The bounded region can be configured to display contents corresponding to the fourth frame in the plurality of image frames. When the bounded region is placed on the first frame, the contents displayed within the bounded region can correspond to the fourth frame. The bounded region can be positioned at any location on the first image frame. The bounded region can be moved using a keyboard, a pointing device operatively coupled to the system and the display device, e.g., a mouse, trackball, touch screen, or both. In addition, the display device can include a near contact screen that is configured to sense the presence of an object, e.g., a user's finger. A user can move the bounded region using the near contact screen.

In some implementations, a second position of the point within the bounded region can be chosen at 615. When the bounded region that enables a user to look ahead into a second image frame is placed on the first image frame, a second position of the chosen point in the second image frame can be displayed within the bounded region. The second position of the point can be chosen by a user. In some implementations, when the bounded region is placed on the first image frame, the first position of the chosen point can be highlighted. Choosing the second position can include clicking the position of the point in the future image frame using a pointing device, e.g., mouse. Alternatively, choosing the second position can include placing the cursor on the first position and dragging the cursor to the second position. The second position can be highlighted. In addition, a line can be displayed connecting the first position and the second position.

In some implementations, the second position can be provided as input to track the position of the point at 620. For example, the second position can be provided as input to a tracking scheme. The tracking scheme can be configured to trace the position of the point across successive frames. The tracking scheme may estimate the position of the point at each frame. The tracking scheme may be unable to determine a position of the point at a frame due to factors including high speed motion, lack of contrast, and the like. In such instances, the second position provided to track the position of the point can serve as a guide line to continue tracking. The tracking scheme can be configured to estimate the position of the point in a frame based on the provided second position of the point in the second image frame.

In some implementations, each point determined to be suitable for tracking can be displayed in the user interface 100 on the display device. The position of each point determined to be suitable for tracking can be stored on a storage device. The storage devices can include computer readable media including semiconductor memory devices, e.g., EPROM, EEPROM, and flash memory devices, magnetic disks, e.g., internal hard disks or removable disks, magneto optical disks, and CD ROM and DVD-ROM disks. The storage device can be operatively coupled to any computer and the contents of the storage device can be accessed by the computer. In addition, the instructions for performing operations, e.g., the detection scheme for selecting suitable points for tracking, the tracking scheme, operation of the video editing application, and the like can also be stored on the same or a separate storage device. The storage device including the instructions can be operatively coupled to a computer and the contents of the storage device, e.g., the stored instructions can be accessed and executed on the computer.

A number of implementations have been described. Nevertheless, it will be understood that various modifications may be made without departing from the spirit and scope of the disclosure. For example, in some implementations, the second image frame can be a snapshot taken a time instant before the first future image frame. The view port can enable a user to determine a previous position of a point. The user can choose and provide the previous position to a tracking scheme. The tracking scheme can track the position of a point backwards in time to determine a change in position of the point.

In some implementations, the corner detection scheme can recommend a plurality of points. A user can choose more than one point for tracking. In addition, the user can use a view port to determine a corresponding position of each of the chosen points in a second image frame. In some implementations, the tracking scheme can use only the corresponding position of a point in the second image frame for tracking. Alternatively, the tracking scheme can use the position of any point in the second image frame to track a change in position of any point in the first image frame. In such implementations, the tracking scheme can use the relative distance between two selected points for tracking.

In some implementations, the user can specify a second position of a point in a second image frame using a view port. Subsequently, the user can specify a third position of the point in a third image frame using the view port. The tracking scheme can use the second and the third positions of the point as inputs in tracking the position of the point across successive frames from the first image frame to the second image frame, the first image frame to the third image frame, from the second image frame to the third image frame, or any combinations of starting and ending frames in between. Accordingly, other implementations are within the scope of the following claims.

What is claimed is:

1. A computer-implemented method comprising:
   displaying an image frame of a plurality of image frames;
   receiving from a user a selection including a position of a point on the displayed image frame;
   overlaying, in response to said receiving the selection of the position of the point, a bounded region on the displayed image frame;
   displaying, in the bounded region overlaid on the displayed image frame, content relating to another image frame of the plurality of image frames, the content displayed in the bounded region including another position of the point at a different time than the position of the point associated with the received selection;
   receiving from the user another selection including the other position of the point inside the bounded region; and
   tracking the position of the point from the displayed image frame to the other image frame based at least in part on (i) the position of the point associated with the received selection and (ii) the other position of the point associated with the received other selection.

2. The method of claim 1 wherein the bounded region is overlaid on the displayed image in an area surrounding the point.

3. The method of claim 1 wherein the plurality of image frames relate to a video content.

4. The method of claim 3 wherein the displayed image frame corresponds to a time instant in the video content, and the other image frame corresponds to another time instant after the time instant corresponding to the displayed image frame.

5. The method of claim 3 wherein the image frame corresponds to a time instant in the video content, and the other image frame corresponds to another time instant before the time instant corresponding to the displayed image frame.

6. The method of claim 1, further comprising:
   analyzing the displayed image frame using a corner detection scheme; and
   providing a result of said analyzing to the user prior to said receiving the selection of the position of the point.

7. The method of claim 6 wherein the corner detection scheme is the Harris corner detection scheme.

8. The method of claim 6 wherein said providing the result of said analysis comprises highlighting one or more points on the displayed image frame analyzed using the corner detection scheme.

9. The method of claim 8 wherein the point is one of the one or more highlighted points, such that the position of the point included in the selection received from the user is a position corresponding to the one of the one or more highlighted points.

10. The method of claim 1 wherein the content displayed within the bounded region overlaid on the displayed image frame is a zoomed in view of the content in the other image frame associated with the received other selection.

11. The method of claim 1 wherein said tracking the position of the point comprises:
tracing positions of the point in image frames of the plurality of image frames that are between the image frame and the other image frame; and
upon being unable to trace the position of the point in one of the image frames between the image frame and the other image frame, using the other position of the point associated with the received other selection as an estimate of an actual position of the point for subsequent tracing.

12. A non-transitory computer-readable medium bearing instructions to enable one or more machines to perform operations comprising:
displaying an image frame of a plurality of image frames;
receiving from a user a selection including a position of a point on the displayed image frame;
overlaying, in response to said receiving the selection of the position of the point, a bounded region on the displayed image frame;
displaying, in the bounded region overlaid on the displayed image frame, content relating to another image frame of the plurality of image frames, the content displayed in the bounded region including another position of the point at a different time than the position of the point associated with the received selection;
receiving from the user another selection including the other position of the point inside the bounded region; and
tracking the position of the point from the displayed image frame to the other image frame based at least in part on (i) the position of the point associated with the received selection and (ii) the other position of the point associated with the received other selection.

13. The medium of claim 12 wherein the bounded region is overlaid on the displayed image in an area surrounding the point.

14. The medium of claim 12 wherein the plurality of image frames relate to a video content.

15. The medium of claim 14 wherein the displayed image frame corresponds to a time instant in the video content, and the other image frame corresponds to another time instant after the time instant corresponding to the displayed image frame.

16. The medium of claim 14 wherein the image frame corresponds to a time instant in the video content, and the other image frame corresponds to another time instant before the time instant corresponding to the displayed image frame.

17. The medium of claim 12, the operations further comprising:
analyzing the displayed image frame using a corner detection scheme; and
providing a result of said analyzing to the user prior to said receiving the selection of the position of the point.

18. The medium of claim 17 wherein the corner detection scheme is the Harris corner detection scheme.

19. The medium of claim 17, wherein said providing the result of said analysis comprises highlighting one or more points on the displayed image frame analyzed using the corner detection scheme.

20. The medium of claim 19 wherein the point is one of the one or more highlighted points, such that the position of the point included in the selection received from the user is a position corresponding to the one of the one or more highlighted points.

21. The medium of claim 12 wherein the content displayed within the bounded region overlaid on the displayed image frame is a zoomed in view of the content in the other image frame associated with the received other selection.

22. The medium of claim 12 wherein said tracking the position of the point comprises:
tracing positions of the point in image frames of the plurality of image frames that are between the image frame and the other image frame; and
upon being unable to trace the position of the point in one of the image frames between the image frame and the other image frame, using the other position of the point associated with the received other selection as an estimate of an actual position of the point for subsequent tracing.

23. The method of claim 2 further comprising displaying within the overlaid bounded region a representation of the position of the point on displayed image frame.

24. The method of claim 23 wherein said displaying within the overlaid bounded region of the representation of the position of the point includes displaying a mark corresponding to the position of the point in the displayed image frame.

25. The method of claim 23, further comprising connecting, in response to said receiving the other selection including the other position of the point, the representation of the position of the point with the other position of the point through a visible line.

26. The method of claim 23, further comprising drawing a line from the representation of the position of the point to the other position of the point, said drawing in response to said receiving the other selection including the other position of the point.

27. The medium of claim 13, the operations further comprising displaying within the overlaid bounded region a representation of the position of the point on displayed image frame.

28. The medium of claim 27 wherein said displaying within the overlaid bounded region of the representation of the position of the point includes displaying a mark corresponding to the position of the point in the displayed image frame.

29. The medium of claim 27, the operations further comprising connecting, in response to said receiving the other selection including the other position of the point, the representation of the position of the point with the other position of the point through a visible line.

30. The medium of claim 29, the operations further comprising drawing a line from the representation of the position of the point to the other position of the point, said drawing in response to said receiving the other selection including the other position of the point.

* * * * *